US012417524B2

(12) United States Patent
Chen et al.

(10) Patent No.: US 12,417,524 B2
(45) Date of Patent: Sep. 16, 2025

(54) METHOD AND SYSTEM OF INSPECTING VEHICLE

(71) Applicants: NUCTECH COMPANY LIMITED, Beijing (CN); Tsinghua University, Beijing (CN)

(72) Inventors: Zhiqiang Chen, Beijing (CN); Li Zhang, Beijing (CN); Yuanjing Li, Beijing (CN); Yuxiang Xing, Beijing (CN); Jie Shi, Beijing (CN)

(73) Assignees: NUCTECH COMPANY LIMITED, Beijing (CN); Tsinghua University, Beijing (CN)

(*) Notice: Subject to any disclaimer, the term of this patent is extended or adjusted under 35 U.S.C. 154(b) by 374 days.

(21) Appl. No.: 17/928,166

(22) PCT Filed: May 24, 2021

(86) PCT No.: PCT/CN2021/095487
§ 371 (c)(1),
(2) Date: Nov. 28, 2022

(87) PCT Pub. No.: WO2021/238855
PCT Pub. Date: Dec. 2, 2021

(65) Prior Publication Data
US 2023/0206414 A1 Jun. 29, 2023

(30) Foreign Application Priority Data
May 28, 2020 (CN) .......................... 202010471992.1

(51) Int. Cl.
*G06K 9/00* (2022.01)
*G06T 1/00* (2006.01)
(Continued)

(52) U.S. Cl.
CPC .......... *G06T 7/0002* (2013.01); *G06T 1/0007* (2013.01); *G06T 1/20* (2013.01);
(Continued)

(58) Field of Classification Search
CPC ....... G06T 7/0002; G06T 1/0007; G06T 1/20; G06T 7/33; G06T 7/97;
(Continued)

(56) References Cited

U.S. PATENT DOCUMENTS 7,417,440 B2 * 8/2008 Peschmann ............ G01R 27/06
324/637
8,137,976 B2 * 3/2012 Bjorkholm ............ G01N 23/04
436/57
(Continued)

FOREIGN PATENT DOCUMENTS

CN 101050962 A 10/2007
CN 103034838 A 4/2013
(Continued)

OTHER PUBLICATIONS

Extended European Search Report dated Jun. 6, 2024 for corresponding EP Application No. 21812904.7 (9 pages).
(Continued)

*Primary Examiner* — Shervin K Nakhjavan
(74) *Attorney, Agent, or Firm* — Merchant & Gould P.C.

(57) ABSTRACT

A method of inspecting a vehicle includes: acquiring a to-be-inspected image of an inspected vehicle (S11); acquiring a visual feature of the to-be-inspected image using a first neural network model (S12); retrieving a template image from a vehicle template library based on the visual feature of the to-be-inspected image (S13); determining a variation region between the to-be-inspected image and the template image (S14); and presenting the variation region to a user (S15). The system of inspecting a vehicle includes a radia-
(Continued)

tion imaging device (150), a display device (130), an image processor (140), and a storage device (120). The present disclosure further includes a computer-readable storage medium.

9 Claims, 4 Drawing Sheets

(51) Int. Cl.
G06T 1/20 (2006.01)
G06T 7/00 (2017.01)
G06T 7/33 (2017.01)
(52) U.S. Cl.
CPC .............. *G06T 7/33* (2017.01); *G06T 7/97* (2017.01); *G06T 2207/10116* (2013.01); *G06T 2207/20084* (2013.01); *G06T 2207/30248* (2013.01)
(58) Field of Classification Search
CPC . G06T 2207/10116; G06T 2207/20084; G06T 2207/30248; G06T 7/001; G06T 7/0004; G01V 5/20; G01N 2223/426; G01N 2223/631; G01N 23/04; Y02T 10/40
See application file for complete search history.

(56) References Cited

U.S. PATENT DOCUMENTS

| | | | |
|---|---|---|---|
| 8,150,105 B2* | 4/2012 | Mian | G01V 5/22 382/104 |
| 9,036,779 B2* | 5/2015 | Morton | G21K 1/02 378/150 |
| 10,302,807 B2* | 5/2019 | Yu | G06V 20/52 |
| 10,324,223 B2* | 6/2019 | Al-Hoshani | G01N 35/02 |
| 10,809,415 B2* | 10/2020 | Qu | G01N 23/10 |
| 10,830,920 B2* | 11/2020 | Parikh | G06T 7/0004 |
| 11,062,440 B2* | 7/2021 | Marciano | G06T 7/60 |
| 11,182,889 B2* | 11/2021 | Wang | G06V 10/764 |
| 11,734,831 B2* | 8/2023 | Cho | G06T 7/32 382/173 |
| 12,174,334 B2* | 12/2024 | Parikh | G08B 13/194 |
| 2006/0114531 A1* | 6/2006 | Webb | G01N 21/8851 359/15 |
| 2008/0133521 A1 | 6/2008 | Podilchuk | |
| 2008/0136625 A1* | 6/2008 | Chew | G01V 5/20 340/540 |
| 2009/0202107 A1 | 8/2009 | Wilson | |
| 2012/0076257 A1* | 3/2012 | Star-Lack | G01V 5/226 378/57 |
| 2016/0070986 A1* | 3/2016 | Chidlovskii | G06V 20/54 382/104 |
| 2016/0148072 A1* | 5/2016 | Chan | G06V 20/54 382/104 |
| 2017/0160426 A1 | 6/2017 | Li et al. | |
| 2017/0242148 A1 | 8/2017 | Yu et al. | |
| 2019/0087686 A1 | 3/2019 | Du | |

FOREIGN PATENT DOCUMENTS

| | | | | |
|---|---|---|---|---|
| CN | 103150904 | A | | 6/2013 |
| CN | 104036275 | A | | 9/2014 |
| CN | 104459813 | A | * | 3/2015 ........... B62D 65/005 |
| CN | 105320703 | A | | 2/2016 |
| CN | 105354533 | A | | 2/2016 |
| CN | 105372712 | A | | 3/2016 |
| CN | 105807335 | A | | 7/2016 |
| CN | 105809655 | A | | 7/2016 |
| CN | 108446612 | A | | 8/2018 |
| CN | 109191491 | A | | 1/2019 |
| CN | 109271980 | A | | 1/2019 |
| CN | 109684986 | A | | 4/2019 |
| CN | 110826484 | A | | 2/2020 |
| CN | 111078946 | A | | 4/2020 |
| EP | 3128496 | A1 | | 2/2017 |

OTHER PUBLICATIONS

Talmi Itamar et al, "Template Matching with Deformable Diversity Similarity", IEEE Conference on Computer Vision and Pattern Recognition (CVPR), IEEE Computer Society, 2017, pp. 1311-1319, XP033249470, ISSN: 1063-6919, DOI: 10.1109/CVPR. 2017.144.
Josef Sivic et al, "Video Google: Efficient Visual Search of Videos", Toward Category-Level Object Recognition Lecture Notes in Computer Science; LNCS, 2007, 4170:127-144, XP019053244, ISBN: 978-3-540-68794-8.
Written Opinion of the International Search Report for PCT Application No. PCT/CN2021/095487 mailed Aug. 30, 2021.
Office Action issued Jun. 2, 2022 from CNIPA for Chinese application No. 202010471992.1.

* cited by examiner

METHOD AND SYSTEM OF INSPECTING VEHICLE

CROSS-REFERENCE TO RELATED APPLICATION

This application is a Section 371 National Stage Application of International Application No. PCT/CN2021/095487, filed on May 24, 2021, entitled "METHOD AND SYSTEM OF INSPECTING VEHICLE", which is incorporated herein by reference in its entirety which claims priority to Chinese patent Application No. 202010471992.1, filed on May 28, 2020, the content of which are incorporated herein by reference in their entirety.

TECHNICAL FIELD

Embodiments of the present disclosure relate to a radiation inspection, and in particular, to a method and a system of inspecting a vehicle.

BACKGROUND

Radiation imaging is an important means for security inspection of various vehicles (such as a large container truck, a small truck, etc.). After performing X-ray radiation imaging on a vehicle and generating an X-ray radiation image of the whole vehicle, a security inspector may check the X-ray radiation image to determine whether there is a suspect on the vehicle, so as to achieve a purpose of security inspection.

With a gradual improvement of security inspection level, a demand for a detection of related suspects in the security inspection of large trucks is also growing. Meanwhile, with a rapid development of machine learning and deep neural network in recent years, the artificial intelligence industry has been gradually applied to all aspects of modern life, and the effects are obvious to all. As a branch of artificial intelligence industry, computer vision is currently the most widely used direction of scientific research, development and application, and corresponding algorithms of computer vision are updated at an explosive speed every year.

A target detection algorithm in computer vision has been well applied in a field of security inspection, and has achieved a good result. Therefore, the research on an automatic detection of a suspect based on an X-ray radiation image has developed rapidly. At present, the existing related algorithms are mostly used in a detection of suspicious item in portable baggage, and are rarely applied in an automatic detection of suspicious item of the generated radiation images based on large trucks, and the obtained result is not ideal.

SUMMARY

In view of one or more problems in the prior art, there is provided a method and a system of inspecting a vehicle.

According to an aspect of the present disclosure, there is provided a method of inspecting a vehicle, including: acquiring a to-be-inspected image of an inspected vehicle; acquiring a visual feature of the to-be-inspected image using a first neural network model; retrieving a template image from a vehicle template library based on the visual feature of the to-be-inspected image; determining a variation region between the to-be-inspected image and the template image; and presenting the variation region to a user.

According to some embodiments, the vehicle template library is constructed by: acquiring a plurality of template vehicle images; acquiring visual features of the plurality of template vehicle images using the first neural network model; and clustering the visual features, and determining the clustered visual features as the vehicle template library.

According to some embodiments, the retrieving a template image from a vehicle template library based on the visual feature of the to-be-inspected image includes: calculating feature similarities between the visual feature of the to-be-inspected image and all visual features in the vehicle template library, and determining a template vehicle image corresponding to a maximum feature similarity as the template image.

According to some embodiments, the determining a variation region between the to-be-inspected image and the template image includes: registering the to-be-inspected image with the template image; extracting feature maps of the registered to-be-inspected image and the registered template image; and determining a difference between the feature maps of the to-be-inspected image and the template image.

According to some embodiments, the feature maps of the to-be-inspected image and the template image are extracted using a second neural network model.

According to some embodiments, the presenting the variation region to a user includes: highlighting the variation region on the to-be-inspected image.

According to some embodiments, before acquiring a to-be-inspected image of an inspected vehicle, the method further includes: performing X-ray scanning on the inspected vehicle to obtain an X-ray image of the inspected vehicle; and preprocessing the X-ray image.

According to some embodiments, the method further includes: performing a linear transformation on the preprocessed X-ray image to obtain the to-be-inspected image.

According to another aspect of the present disclosure, there is provided a system of inspecting a vehicle, including:
 a display device,
 an image processor, and
 a storage device coupled with the image processor and storing computer-readable instructions, wherein the computer-readable instructions, when executed by the image processor, cause the image processor to:
 acquire a to-be-inspected image of an inspected vehicle;
 acquire a visual feature of the to-be-inspected image using a first neural network model;
 retrieve a template image from a vehicle template library based on the visual feature of the to-be-inspected image;
 determine a variation region between the to-be-inspected image and the template image; and
 control the display device to present the variation region to a user.

According to some embodiments, the vehicle template library is constructed by: acquiring a plurality of template vehicle images; acquiring visual features of the plurality of template vehicle images using the first neural network model; and clustering the visual features, and determining the clustered visual features as the vehicle template library.

According to some embodiments, the computer-readable instructions, when executed by the image processor, further cause the image processor to: calculate feature similarities between the visual feature of the to-be-inspected image and all visual features in the vehicle template library, and determine a template vehicle image corresponding to a maximum feature similarity as the template image.

According to some embodiments, the computer-readable instructions, when executed by the image processor, further cause the image processor to: register the to-be-inspected image with the template image; extract feature maps of the registered to-be-inspected image and the registered template image; and detect a difference between the feature maps of the to-be-inspected image and the template image.

According to some embodiments, the feature maps of the to-be-inspected image and the template image are extracted using a second neural network model.

According to some embodiments, the computer-readable instructions, when executed by the image processor, further cause the image processor to: control the display device to highlight the variation region on the to-be-inspected image.

According to some embodiments, the system further includes: a radiation imaging device configured to perform X-ray scanning on the inspected vehicle to obtain an X-ray image of the inspected vehicle, wherein the computer-readable instructions, when executed by the image processor, further cause the image processor to: preprocess the X-ray image.

According to some embodiments, the computer-readable instructions, when executed by the image processor, further cause the image processor to: perform a linear transformation on the preprocessed X-ray image to obtain the to-be-inspected image.

According to another aspect of the present disclosure, there is provided a computer-readable storage medium storing instructions, wherein the instructions, when executed by a processor, cause the processor to execute the method described above.

BRIEF DESCRIPTION OF THE DRAWINGS

In order to better understand the present disclosure, the present disclosure will be described in detail according to the following accompanying drawings.

DETAILED DESCRIPTION OF EMBODIMENTS

Figure 1:
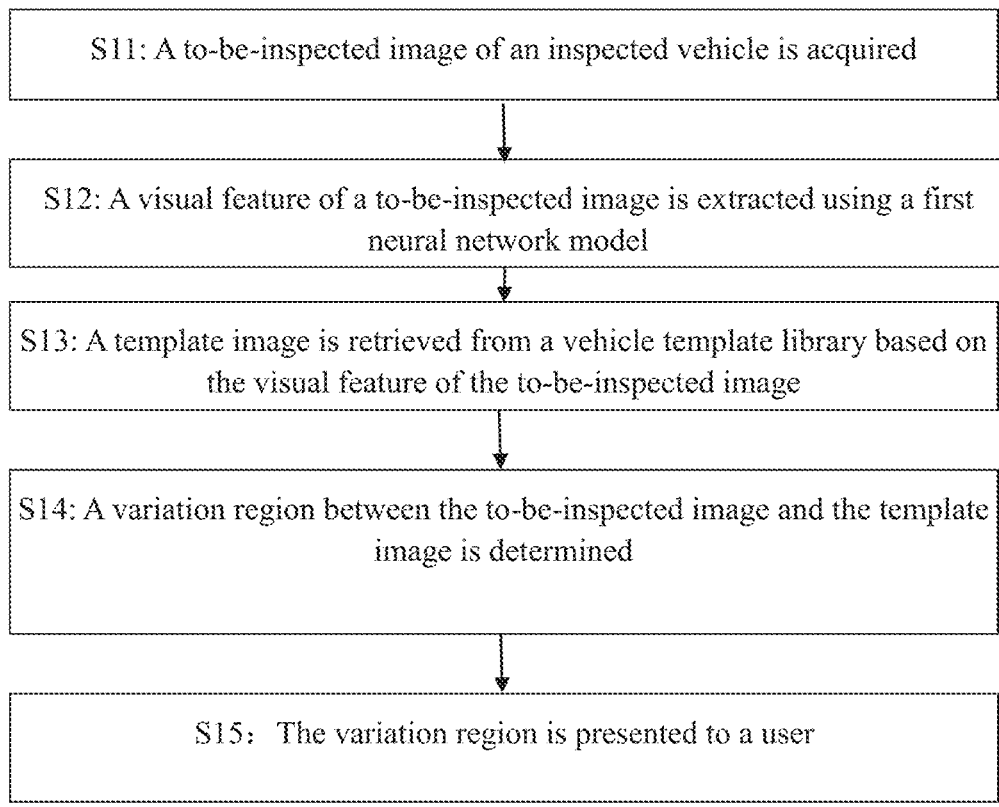
FIG. 1 shows a schematic flowchart describing a method of inspecting a vehicle according to embodiments of the present disclosure.

Specific embodiments of the present disclosure will be described in detail below. It should be noted that embodiments described here are merely illustrative and are not intended to limit the present disclosure. In the following description, numerous specific details are set forth in order to provide a thorough understanding of the present disclosure. However, it is obvious to those of ordinary skill in the art that it is not necessary to implement the present disclosure with these specific details. In other examples, well-known structures, materials, or methods are not specifically described in order to avoid obscuring the present disclosure.

Throughout the specification, reference to "one embodiment", "an embodiment", "one example" or "an example" means: particular features, structures, or characteristics described in connection with the embodiment or example are included in at least one embodiment of the present disclosure. Thus, the phrases "in one embodiment", "in an embodiment", "in one example" or "in an example" appearing in various places throughout the specification do not necessarily refer to the same embodiment or example. Furthermore, the particular features, structures, or characteristics may be combined in any suitable combination and/or sub-combination in one or more embodiments or examples. Moreover, those of ordinary skill in the art should understand that the term "and/or" as used herein includes any and all combinations of one or more of the related listed items.

An intelligent security inspection of a vehicle usually adopts the following methods: a vehicle chassis detection system mainly uses a digital camera to take a picture of a vehicle chassis, and the security inspector determines whether the vehicle chassis contains a suspicious entrainment by checking a visible light image of the chassis; a security inspection inside the vehicle is mainly carried out through the security inspector holding the detector, scanning every corner of the vehicle interior, or manually searching the articles in a suspected region. The two methods have high requirements on the professionalism of the security inspector, consume security inspection time, and are inefficient, and often result in an accumulation of a large number of to-be-inspected vehicles. To a certain extent, the operator's lack of attention will miss some suspicious items. The X-ray method is to form a radiation image of the whole vehicle through the X-ray penetration of the whole vehicle, and assist the inspector to find the suspect through the different properties of the X-ray penetration of different substances.

A vehicle is a three-dimensional target, and an image formed by the X-ray detection instrument is a two-dimensional image. Therefore, there will be a large number of overlapping target regions in the image. In addition, the goods inside the vehicle are messy and different in shape, and the security inspector may not inspect all regions of the image at the same time. Therefore, it is very difficult for the security inspector to find suspects by directly observing the image.

At present, the target detection algorithm in computer vision has been well used in a field of security and has achieved good results. At present, the existing related algorithms are mostly used in the detection of suspicious item in portable baggage. However, the research literature and patents of automatic detection of contraband based on perspective images generated by large truck equipment are relatively few. At the same time, the existing vehicle model template matching method meets the requirement of a single vehicle model template matching project, but when the method is applied to other projects, such as vehicle suspicious item detection, the obtained result is not satisfactory. The existing vehicle model template matching method mainly uses content-based image retrieval technology: (1) Image preprocessing: a vehicle in a scanned image is cropped, a minimum rectangular position of the vehicle in the original image is determined as a to-be-processed sub-image, and the surrounding air portion is removed; then the size of the vehicle sub-images is scaled, and a scaling factor may be adjusted according to the original size of the specific image, the number of extracted feature points and other information; (2) Feature extraction: the Bag of Words (BOW) model commonly used in the information retrieval field is used to perform block statistics on the whole map; (3) Establishment of a retrieval model: the characteristics of the BOW model are used to build a well-known KD tree model, and feature matching is performed through the fast library for approximate nearest neighbors (FLANN) algorithm of open code; Extraction process: for the image obtained after preprocessing, the system searches the retrieval model corresponding to its equipment number to find the most similar empty vehicle template.

The existing suspect detection methods input the to-be-inspected image and the template image, use the edge information to crop the vehicle, and then unify the size of the cropped regions through downsampling. Then, after performing rigid registration, amplitude transformation and elastic registration on the cropped regions, a difference calculation is performed on the two obtained images to obtain a difference map, and after a series of post-processing, a difference portion is finally displayed.

In summary, the vehicle model template matching method and the suspect detection method have great disadvantages. The vehicle model template matching method mainly relies on the Bag of Words model for retrieval, which is inefficient and prone to false alarm. The sift algorithm and FLANN algorithm used in the difference detection are image based feature extraction matching methods, but the methods will result in wrong matching vehicle model templates, and a registration rate is not high. The difference detection method mainly depends on the difference between images and the post-processing method of images for detection. The method is greatly influenced by human factors. Although the post-processing method may reduce the false alarm rate to a certain extent, there will be more missed inspections. At the same time, the difference calculation may meet the detection speed and accuracy of a small vehicle to a certain extent, but the extracted image region of a large truck is large, thus the detection speed will be greatly affected, and the accuracy will also decrease.

In order to solve the above-mentioned problems and achieve more efficient and accurate vehicle inspection, embodiments of the present disclosure proposes a combined method of vehicle model template retrieval and automatic detection of suspicious item difference in combination with the depth learning algorithm, which solves the following problems: (1) a stereo deformation problem in a matching process is solved, so that a template image and a to-be-inspected image may be matched more accurately; (2) problems of small amount of generated data in the template library, slow speed, large error in retrieving matched templates, slow matching speed, etc. are solved; (3) the depth neural network is used to solve the problem of false detection caused by the suspicious item and the goods, scanning noise, and the like in a process of difference detection.

In a method of inspecting a vehicle according to some embodiments of the present disclosure, a to-be-inspected image of an inspected vehicle is acquired; a visual feature of the to-be-inspected image is acquired using a first convolution neural network model; a template image is retrieved from a vehicle template library based on the visual feature of the to-be-inspected image; a variation region between the to-be-inspected image and the template image is determined; and the variation region is presented to a user. In the embodiments described above, a linear transformation combination is performed on the preprocessed vehicle template data, and then the vehicle features are extracted through the first neural network to construct the vehicle template library; a linear transformation combination is performed the preprocessed to-be-inspected image, and then a feature of the to-be-inspected vehicle is extracted through the first convolution neural network, and the feature is matched and clustered with the features in the vehicle template library, and the most similar vehicle template is extracted. The obtained template image and the to-be-inspected image are input into the second convolution neural network simultaneously, and a significance detection is performed on a key position, and finally an entrainment is shown in a result. Thus, an identification rate of a suspect in a vehicle and a real-time performance of the algorithm are improved, and a requirement of cross-device application in a same scene is met.

FIG. 1 shows a schematic flowchart describing a method of inspecting a vehicle according to embodiments of the present disclosure. As shown in FIG. 1, in step S11, a to-be-inspected image of an inspected vehicle is acquired. Due to different energy/dose of radiation source and different detector sizes, different radiation scanning devices may obtain different scanned radiation images on a same vehicle. The two images (including a to-be-inspected image and a template image used to build the vehicle template library) used in embodiments of the present disclosure should in principle be selected from the radiation images acquired in a same application site. The resolution of the radiation image is determined by the scanning device. Due to the different lengths and widths of freight vehicles, there are often air regions of different sizes around the vehicles in the scanned images. These air regions not only affect an efficiency of the algorithm, but also their noise may affect an effectiveness of the algorithm. In embodiments of the present disclosure, before acquiring the to-be-inspected image of the inspected vehicle, X-ray scanning is performed on the inspected vehicle to obtain an X-ray image of the inspected vehicle, and then the X-ray image is preprocessed. In addition, before building the vehicle template library, it is necessary to obtain a large number of X-ray images of template vehicle images. In the embodiment, the acquired X-ray image is preprocessed by cropping and downsampling.

Figure 3A:
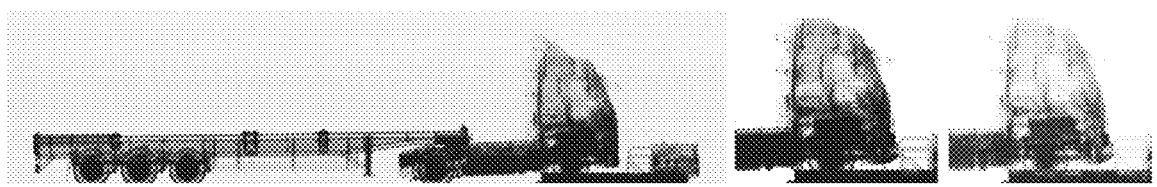
FIG. 3A and FIG. 3B respectively show a process of obtaining a local image of a vehicle by cropping the acquired vehicle X-ray image and a process of linear transformation combination.

First, the region of the vehicle part in the X-ray image is cropped out. The trained convolutional neural network is used to locate a target approximate region of the vehicle by taking the vehicle features extracted from the model as main basis. Then, through some necessary denoising and nonlinear "whitening" methods, the position of the vehicle in the X-ray image is determined. The smallest rectangle where the vehicle is located is determined as a sub-image for subsequent processing, such as open operation, close operation, etc., to obtain a local maximum connection region of the vehicle. FIG. 3A shows a process of obtaining a local image of a vehicle by cropping the acquired vehicle X-ray image.

Then, the downsampling may be performed on the local image of the vehicle. If the image after cropping is still too large, it may be considered to further reduce the size of the image by downsampling.

Since vehicle angles obtained by cropping are different, a specific preprocessing method is further required to unify vehicle directions into one direction. The preprocessing method for determining and changing a vehicle direction is: since front and rear positions of a vehicle head and a compartment are fixed, a direction of the vehicle may be determined by determining a relative position of the vehicle head and the compartment, and then the image is subjected to mirror image transformation to obtain the vehicle head in a unified direction.

Figure 3B:
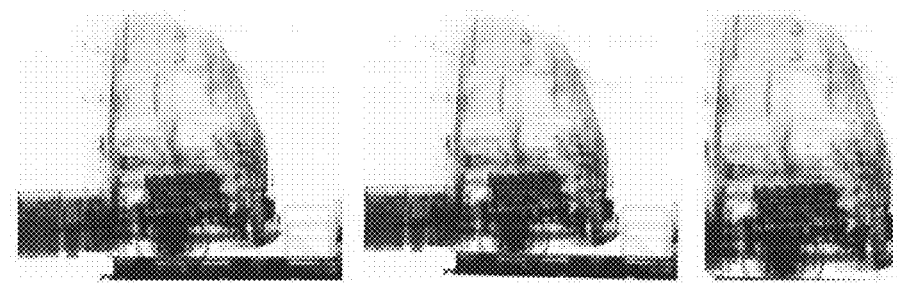

In order to facilitate the detection of suspicious item in the subsequent difference detection, the to-be-inspected image or template image is subjected to a linear transformation to obtain the image under a same standard. A quality of the result of the process has a great impact on the result of the subsequent difference detection. There are numerous linear transformation methods, such as perspective transformation, affine transformation, etc. There are numerous feature extraction methods, which are easy for those skilled in the art to understand, and those skilled in the art may also conceive several alternative algorithms of feature extraction methods, such as, classic Scale Invariant Feature Transform algorithm (SIFT), Smallest Univalue Segment Assimilating Nucleus (SUSAN), Harris corner detection operator, Speed Up Robust Feature algorithm (Surf), etc. Preferably, since the process only requires rotation and translation of the image, affine transformation is selected as the basic transformation method, and six parameters required for affine transformation are obtained by learning through combination with a convolutional neural network. Finally, a bilinear interpolation method is used to place the transformed pixel information into an empty feature map, so as to obtain a final to-be-inspected image or template image, as shown in FIG. 3B.

Referring to FIG. 1, in step S12, a visual feature of a to-be-inspected image is extracted using a first neural network model. In this embodiment, the first neural network model uses a convolutional neural network (CNN) to build an encoder, so as to obtain the visual feature of the to-be-inspected image. In some embodiments, each parameter of the first neural network may be obtained through training. For example, a large number of vehicle sample images are used as training samples to train the first neural network, the input template vehicle X is convolved, and a model with $X=g(Z)$ is trained after fine extraction of a depth neural network, where Z is a feature in a feature space.

In step S13, a template image is retrieved from a vehicle template library based on the visual feature of the to-be-inspected image. The vehicle template library is constructed based on a large number of template vehicle images. The construction of the vehicle template library will be described in detail in the following. Retrieving the template image from the vehicle template library involves matching the to-be-inspected image with the template images in the template library, so as to obtain the template image most similar to the to-be-inspected image.

In step S14, a variation region between the to-be-inspected image and the template image is determined. In this embodiment, the step implements a difference detection between the to-be-inspected image and the template image, and then detects a suspect. The existing method is to calculate a difference of the to-be-inspected image and the matched template image, that is, to obtain a difference map. However, the method of using the difference map is greatly affected by template matching. If the template and the to-be-inspected image are poorly matched, a plurality of false detections will occur. In order to eliminate the false detections, the algorithm requires a large amount of post-processing methods. In the present disclosure, the difference detection method uses the neural network to extract the feature maps of the to-be-inspected image and the template image, and determine the difference between the feature maps. The false detections may be reduced to a certain extent and a large amount of post-processing methods may be saved.

In step S15, the variation region is presented to a user. The step is to better mark a position of the detected suspect in the to-be-inspected image, so as to facilitate the inspection personnel to observe. For example, a boundary of the suspect may be marked with a curve of a specific color or all pixels in the suspect region may be directly colored.

Figure 2:
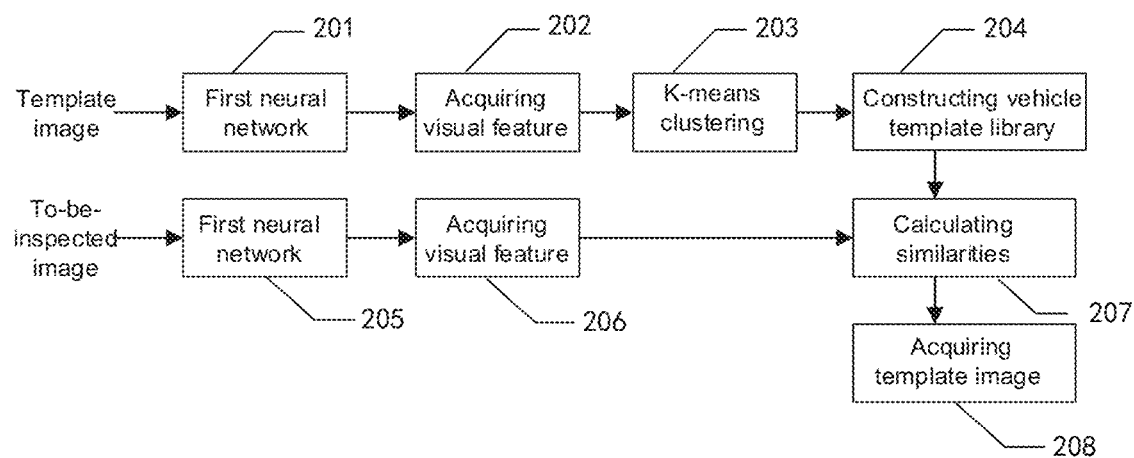
FIG. 2 shows a schematic diagram describing constructing a vehicle template library and retrieving a template image in a method of inspecting a vehicle according to embodiments of the present disclosure.

FIG. 2 shows a schematic diagram describing constructing a vehicle template library and retrieving a template image in a method of inspecting a vehicle according to embodiments of the present disclosure.

First, at block 201, a plurality of template vehicle images are acquired. Similar to acquiring the to-be-inspected image, a plurality of template vehicle images are acquired by acquiring a large number of X-ray images of the template images of vehicles, and the acquired X-ray images are preprocessed by cropping and downsampling. Similarly, in order to facilitate the detection of suspicious item in the subsequent difference detection, the preprocessed template images are subjected to a combined linear transformation to obtain images under a same standard.

In embodiments, at block 202, the first neural network model is used to acquire the visual features of the plurality of template vehicle images. In the embodiment, the first neural network model uses a convolutional neural network (CNN) to build an encoder, so as to obtain the visual features of the template vehicle image. In some embodiments, each parameter of the first neural network may be obtained through training. For example, a large number of vehicle sample images are used as training samples to train the first neural network, the input template vehicle X is convolved, and a model with $X=g(Z)$ is trained after fine extraction of the depth neural network, where Z is a feature in a feature space. The first neural network model is used to encode all template vehicle image data, that is, to extract visual features and preserve the visual features. The process may extract features from a large number of template vehicle images in a short time.

At block 203, the extracted visual features are clustered. In order to accelerate the speed of template image lookup, the present disclosure uses a clustering method. Clustering methods mainly include: FCM clustering algorithm, SOM clustering algorithm, hierarchical clustering algorithm, and k-means clustering algorithm. Considering an efficiency of template image extraction, k-means clustering method is used in the embodiment, which is one of the classical clustering algorithms. Due to the high efficiency of the algorithm in large-scale datasets, the algorithm is widely used. At present, numerous algorithms have been expanded and improved around the algorithm.

At block 204, the clustered visual features are used as the vehicle template library. In embodiments, the clustering algorithm is used to classify similar vehicles of a same type into one category, so as to obtain a final vehicle template library.

Similarly, in block 205, the to-be-inspected image of the inspected vehicle is acquired, and in block 206, the first neural network model is used to acquire the visual feature of the to-be-inspected image.

At block 207, feature similarities between the visual feature of the to-be-inspected image and all visual features in the vehicle template library are calculated, and a template vehicle image corresponding to a maximum feature similarity is determined as the template image. In embodiments, a Euclidean distance between the visual feature of the extracted to-be-inspected image and the visual features of all template vehicle images in the constructed vehicle template library is calculated. The template vehicle image corresponding to the calculated minimum Euclidean distance is the final output template image, i.e, the template image matched with the to-be-inspected image, as shown in block 208.

The above-mentioned processes of constructing the vehicle template library and extracting the template vehicle image saves manpower, time and memory resources.

Figure 4:
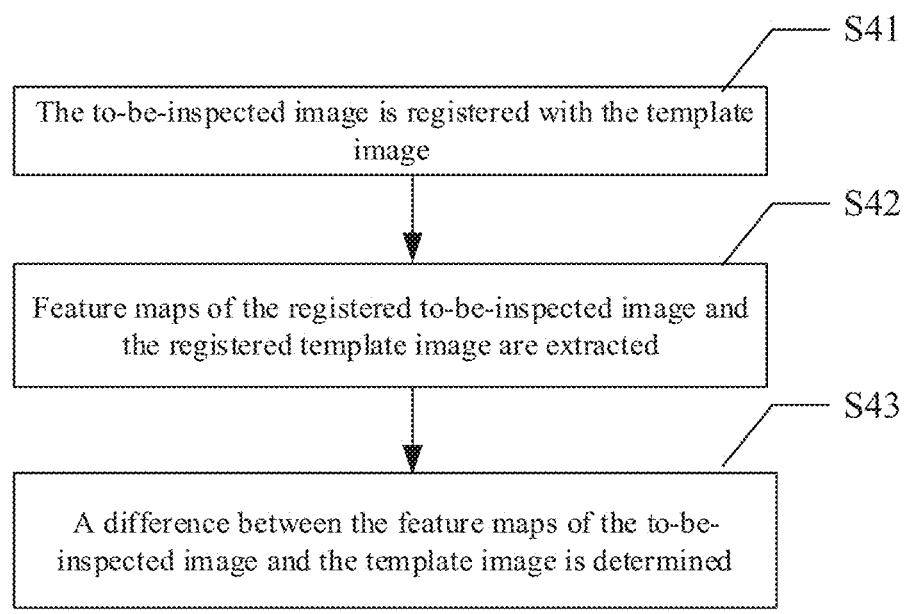
FIG. 4 shows a flowchart for detecting a difference between a to-be-inspected image and a template image in the method according to embodiments of the present disclosure.

FIG. 4 shows a flowchart for detecting a difference between a to-be-inspected image and a template image in the method according to embodiments of the present disclosure. In step S41, the to-be-inspected image is registered with the template image. For example, a method based on feature point alignment is used to register the to-be-inspected image with the template image.

In step S42, feature maps of the registered to-be-inspected image and the registered template image are extracted. In embodiments, Full Convolutional Siamese Metric Networks with shared parameters is used to extract the feature map of the to-be-inspected image and the feature map of the template image. Full Convolutional Siamese Metric Networks is like a feature extractor $\varphi$, which simultaneously extracts the features of the template image z and the to-be-inspected image x, and then sends the extracted features to another function g, thus a similarity measurement function is actually $f(z,x)=g(\varphi(z),\varphi(x))$. The function g may be a very simple distance measure or similarity measure. The twin network has already been widely used in face recognition, key description point learning, and one shot character recognition.

In step S43, a difference between the feature maps of the to-be-inspected image and the template image is determined. In embodiments, the twin network extracts the features of the template image z and the to-be-detected image x, and then sends the features to a similarity function to calculate the similarity. For example, the similarity function uses cross correlation, and the formula is as follows: $f(z,x)=\varphi(z)*\varphi(x)+b1$, namely, $\varphi(z)$ is used as a convolution kernel, and the convolution is carried out on $\varphi(x)$. If the similarity is large, a response value will be naturally large. That is, the twin network may determine the difference between the feature maps through the extracted feature map pairs, so as to determine the position of the suspect in the to-be-inspected image. In embodiments, a distance of the same position in the above-mentioned two feature maps is calculated, and according to a set threshold value, a region greater than the threshold value is the difference portion. The difference detection implemented by using Fully Convolutional Siamese Metric Networks may reduce the false detections and save a large amount of post-processing methods.

Figure 5:
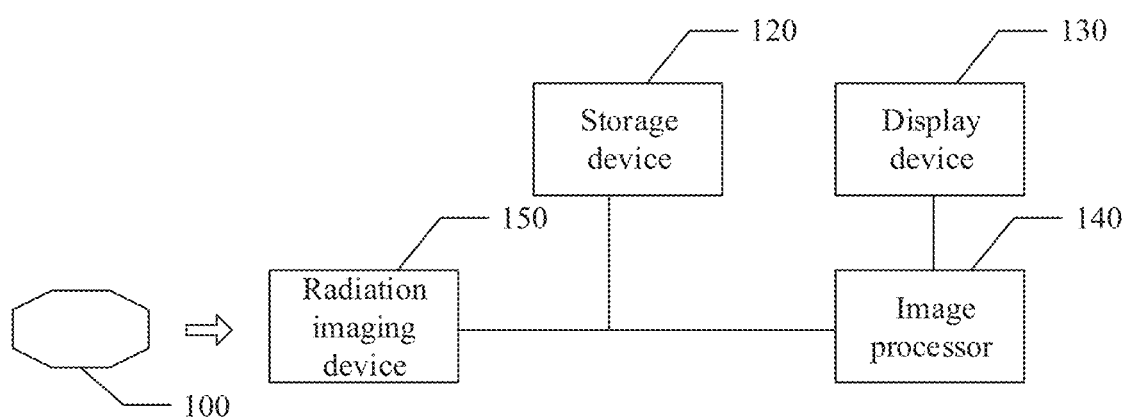
FIG. 5 shows a structural diagram of a system of inspecting a vehicle according to embodiments of the present disclosure.

FIG. 5 shows a structural diagram of a system of inspecting a vehicle according to embodiments of the present disclosure. As shown in FIG. 1, the system of inspecting a vehicle according to embodiments of the present disclosure relates to a safety inspection technology of X-ray radiation imaging, especially an automatic difference detection technology in an automatic detection technology of a suspect in a vehicle. Suspect detection on a scanned image of a vehicle, especially a freight vehicle, may avoid the problems of traditional detection loopholes and poor manual image judgment, which is of great significance for assisting a security inspection of a small vehicle.

The system shown in FIG. 5 includes a radiation imaging device 150, a storage device 120, an image processor 140, and a display device 130.

In some embodiments, the radiation imaging device 150 performs X-ray scanning on the inspected vehicle to obtain the X-ray image of the inspected vehicle. The storage device 120 stores the X-ray image and computer-readable instructions.

The image processor 140 is coupled with the storage device 120, and executes the computer-readable instructions, and acquires a to-be-inspected image of an inspected vehicle; acquires a visual feature of the to-be-inspected image using a first neural network model; retrieves a template image from a vehicle template library based on the visual feature of the to-be-inspected image; determines a variation region between the to-be-inspected image and the template image; and controls the display device to present the variation region to a user. The display device 130 presents the variation region to the user.

For example, when a vehicle needs to be inspected, the radiation imaging device 150 will perform X-ray scanning on the vehicle to obtain the X-ray image of the vehicle. The image processor 140 performs preprocessing and combined linear transformation on the X-ray image to generate a to-be-inspected image of the vehicle. The image processor 140 may also construct a vehicle template library. Specifically, the image processor 140 acquires a plurality of template vehicle images; acquires visual features of the plurality of template vehicle images using the first neural network model; and clusters the visual features, and determines the clustered visual features as the vehicle template library. After constructing the vehicle template library, the to-be-inspected image is matched with the template vehicle images in the vehicle template library to obtain the template image. In embodiments, the image processor 140 calculates feature similarities between the visual feature of the to-be-inspected image and all visual features in the vehicle template library, and determines a template vehicle image corresponding to a maximum feature similarity as the template image. The image processor 140 registers the to-be-inspected image with the template image; extract feature maps of the registered to-be-inspected image and the registered template image; and detects a difference between the feature images of the to-be-inspected image and the template image. A region with a larger difference is the region where the suspect is located.

The display device 130 is used to display the X-ray scanning image, and is further used to draw a variation region between a to-be-inspected image and an optimal template image with a certain color line on the to-be-inspected image according to the data of the variation region. A contour of the variation region is marked with the certain color line on the to-be-inspected image to remind an inspector that there is a suspect here, so as to achieve a better security inspection comparison prompt effect.

The above detailed description has illustrated numerous embodiments of a method and a system of inspecting a vehicle by using schematic diagrams, flowcharts, and/or examples. In the case that such schematic diagrams, flowcharts and/or examples include one or more functions and/or operations, those skilled in the art should understand that each function and/or operation in such diagrams, flowcharts or examples may be implemented individually and/or jointly by various structures, hardware, software, firmware or any combination thereof in essence. In an embodiment, several parts of the subject matter described in embodiments of the present disclosure may be implemented by an application specific integrated circuit (ASIC), a field programmable gate array (FPGA), a digital signal processor (DSP), or other integrated formats. However, those skilled in the art should recognize that some aspects of embodiments disclosed herein in whole or in part may be equally implemented in an integrated circuit, implemented as one or more computer programs running on one or more computers (for example, implemented as one or more programs running on one or more computer systems), implemented as one or more computer programs running on one or more processors (for example, implemented as one or more computer programs running on one or more microprocessors), implemented as firmware, or substantially implemented as any combination of the above, and those skilled in the art will have the ability to design a circuit and/or write software and/or firmware codes according to the present disclosure. In addition, those skilled in the art will recognize that the mechanism of the subject matter of the present disclosure may be distributed as a variety of forms of program products, and the exemplary embodiments of the subject matter of the present disclosure are applicable regardless of the specific type of signal carrier media actually used to perform distribution. Examples of signal carrier media include but are not limited to: recordable media, such as floppy disk, hard disk drive, compact disk (CD), digital versatile disk (DVD), digital tape, computer memory, etc.; and transmission type media, such as digital and/or analog communication media (e.g., an optical fiber cable, a waveguide, a wired communication link, a wireless communication link, etc.).

Although the present disclosure has been described with reference to several typical embodiments, it should be understood that the terms used are illustrative and exemplary, not restrictive. Since the present disclosure may be specifically implemented in various forms without departing from the spirit or essence of the present disclosure, it should be understood that the above-mentioned embodiments are not limited to any of the foregoing details, but should be interpreted broadly within the spirit and scope defined by the appended claims. Therefore, all changes and modifications falling within the scope of the claims or their equivalents should be covered by the appended claims.

What is claimed is:

1. A method of inspecting a vehicle, comprising:
    performing X-ray scanning on an inspected vehicle to obtain an X-ray image of the inspected vehicle;
    preprocessing the X-ray image and performing a linear transformation on the preprocessed X-ray image to obtain a to-be-inspected image of the inspected vehicle;
    acquiring a visual feature of the to-be-inspected image using a first neural network model;
    retrieving a template image from a vehicle template library based on the visual feature of the to-be-inspected image;
    determining a variation region between the to-be-inspected image and the template image;
    marking a contour of the variation region with a color line on the to-be-inspected image according to data of the variation region, so as to prompt a position of a detected suspect in the inspected vehicle; and
    presenting the to-be-inspected image with the position of the detected suspect in the inspected vehicle being prompted,
    wherein the determining a variation region between the to-be-inspected image and the template image comprises: registering the to-be-inspected image with the template image; extracting feature maps of the registered to-be-inspected image and the registered template image; and determining a difference between the feature maps of the to-be-inspected image and the template image,
    wherein the feature maps of the to-be-inspected image and the template image are extracted using a second neural network model.

2. The method according to claim 1, wherein the vehicle template library is constructed by:
    acquiring a plurality of template vehicle images;
    acquiring visual features of the plurality of template vehicle images using the first neural network model; and
    clustering the visual features, and determining the clustered visual features as the vehicle template library.

3. The method according to claim 2, wherein the retrieving a template image from a vehicle template library based on the visual feature of the to-be-inspected image comprises:
    calculating feature similarities between the visual feature of the to-be-inspected image and all visual features in the vehicle template library, and determining a template vehicle image corresponding to a maximum feature similarity as the template image.

4. The method according to claim 1, wherein the presenting the variation region to a user comprises:
    highlighting the variation region on the to-be-inspected image.

5. A non-transitory computer-readable storage medium storing instructions, wherein the instructions, when executed by a processor, cause the processor to execute the method according to claim 1.

6. A system of inspecting a vehicle, comprising:
    a display device,
    an image processor, and
    a storage device coupled with the image processor and storing computer-readable instructions, wherein the computer-readable instructions, when executed by the image processor, cause the image processor to:
    perform X-ray scanning on an inspected vehicle to obtain an X-ray image of the inspected vehicle;
    preprocess the X-ray image and perform a linear transformation on the preprocessed X-ray image to obtain a to-be-inspected image of the inspected vehicle;
    acquire a visual feature of the to-be-inspected image using a first neural network model;
    retrieve a template image from a vehicle template library based on the visual feature of the to-be-inspected image;
    determine a variation region between the to-be-inspected image and the template image;
    mark a contour of the variation region with a color line on the to-be-inspected image according to data of the variation region, so as to prompt a position of a detected suspect in the inspected vehicle; and
    present the to-be-inspected image with the position of the detected suspect in the inspected vehicle being prompted,
    wherein the computer-readable instructions, when executed by the image processor, further cause the image processor to: register the to-be-inspected image with the template image; extract feature maps of the registered to-be-inspected image and the registered template image; and determine a difference between the feature maps of the to-be-inspected image and the template image,
    wherein the feature maps of the to-be-inspected image and the template image are extracted using a second neural network model.

7. The system according to claim 6, wherein the vehicle template library is constructed by:
    acquiring a plurality of template vehicle images;

acquiring visual features of the plurality of template vehicle images using the first neural network model; and clustering the visual features, and determining the clustered visual features as the vehicle template library.

8. The system according to claim 7, wherein the computer-readable instructions, when executed by the image processor, further cause the image processor to:

calculate feature similarities between the visual feature of the to-be-inspected image and all visual features in the vehicle template library, and determine a template vehicle image corresponding to a maximum feature similarity as the template image.

9. The system according to claim 6, wherein the computer-readable instructions, when executed by the image processor, further cause the image processor to:

control the display device to highlight the variation region on the to-be-inspected image.

\* \* \* \* \*